US011921446B2

(12) United States Patent
Ubagai

(10) Patent No.: US 11,921,446 B2
(45) Date of Patent: Mar. 5, 2024

(54) FIXING DEVICE AND IMAGE FORMING APPARATUS

(71) Applicant: Oki Electric Industry Co., Ltd., Tokyo (JP)

(72) Inventor: Akira Ubagai, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 17/528,947

(22) Filed: Nov. 17, 2021

(65) Prior Publication Data

US 2022/0236676 A1 Jul. 28, 2022

(30) Foreign Application Priority Data

Jan. 27, 2021 (JP) ................................ 2021-011541

(51) Int. Cl.
*G03G 15/20* (2006.01)

(52) U.S. Cl.
CPC ..... *G03G 15/2053* (2013.01); *G03G 15/2039* (2013.01); *G03G 15/2064* (2013.01)

(58) Field of Classification Search
None
See application file for complete search history.

(56) References Cited

U.S. PATENT DOCUMENTS

| | | | | |
|---|---|---|---|---|
| 9,696,671 B1 * | 7/2017 | Massie | ............... | G03G 15/2057 |
| 2003/0118363 A1 * | 6/2003 | Izawa | ............... | G03G 15/2064 399/328 |
| 2015/0043953 A1 * | 2/2015 | Nakamoto | ......... | G03G 15/2025 399/329 |
| 2015/0277311 A1 * | 10/2015 | Iwata | ............... | G03G 15/2042 399/329 |
| 2016/0266529 A1 * | 9/2016 | Ishida | ............... | G03G 15/2053 |
| 2018/0059594 A1 | 3/2018 | Takagi | | |
| 2020/0033768 A1 * | 1/2020 | Furuichi | ............... | G03G 15/80 |

FOREIGN PATENT DOCUMENTS

| | | | |
|---|---|---|---|
| JP | 2015175894 A | | 10/2015 |
| JP | 2020-003611 A | | 1/2020 |
| KR | 20140056665 A | * | 12/2014 |

* cited by examiner

*Primary Examiner* — Sevan A Aydin
(74) *Attorney, Agent, or Firm* — Rabin & Berdo, P.C.

(57) ABSTRACT

A fixing device includes an annular belt, a heating member disposed to face an inner circumferential surface of the annular belt; and a heat storage member disposed to face a surface of the heating member on a side opposite to the annular belt. A thermal diffusivity of the heat storage member is lower than a thermal diffusivity of the annular belt.

20 Claims, 12 Drawing Sheets

FIG. 11

| | NUMBER OF FILMS | THICKNESS [mm] | HEAT CAPACITY [J/K] | HEAT CAPACITY PER AREA [J/k·cm$^2$] | GLOSS DIFFERENCE [75°C GLOSS] | WARMING-UP TIME [sec] | HEATER-BACK TEMPERATURE RISING RATE [°C/sec] | THERMAL DIFFUSIVITY $10^{-6}$[m$^2$/sec] |
|---|---|---|---|---|---|---|---|---|
| POLYIMIDE FILM | 1 | 0.06 | 0.35 | 0.01 | 6.5 | 7.73 | 22.1 | 0.302 |
| | 3 | 0.18 | 1.05 | 0.03 | 5.8 | - | - | 0.302 |
| | 4 | 0.24 | 1.40 | 0.04 | 6.1 | - | - | 0.302 |
| | 5 | 0.3 | 1.75 | 0.05 | 4.8 | - | - | 0.302 |
| | 10 | 0.6 | 3.50 | 0.09 | 2.5 | 7.53 | 13.8 | 0.302 |
| | 15 | 0.9 | 5.25 | 0.14 | 1.0 | 7.40 | 8.8 | 0.302 |
| | 16 | 0.96 | 5.60 | 0.15 | - | - | 6.8 | 0.302 |
| | 17 | 1.02 | 5.95 | 0.16 | - | - | 5.0 | 0.302 |
| | 18 | 1.08 | 6.30 | 0.17 | - | - | 4.0 | 0.302 |
| | 20 | 1.2 | 7.00 | 0.19 | - | - | 2.9 | 0.302 |
| COMPARATIVE EXAMPLE 1 (COPPER) | 1 | 0.6 | 7.64 | 0.20 | 7.3 | - | - | 117 |
| COMPARATIVE EXAMPLE 2 (ALUMINUM) | 1 | 0.5 | 4.46 | 0.12 | 6.5 | - | - | 98.8 |

FIXING DEVICE AND IMAGE FORMING APPARATUS

BACKGROUND OF THE INVENTION

1. Field of the Invention

The present disclosure relates to a fixing device and an image forming apparatus.

2. Description of the Related Art

There are image forming apparatuses such as a printer, a copier, and a facsimile machine. The image forming apparatus (for example, the printer) includes an image bearing body. A surface of the image bearing body is uniformly charged by a charging member. The surface of the image bearing body is exposed with light emitted by an exposure device so that an electrostatic latent image is formed thereon. The electrostatic latent image is developed by a developer bearing body to form a toner image. Then, a sheet transported from a sheet cassette is introduced between the image bearing body and a transfer member, and the toner image is transferred to the sheet by the transfer member. Then, the sheet is transported to a fixing device or a fuser. The fixing device fixes the toner image to the sheet, so that printing is completed.

The fixing device includes a fixing belt as an annular belt, a heater as a heating member disposed inside the fixing belt, and a pressure roller pressed against the heater via the fixing belt. In the fixing device, a heat diffusion member is disposed to face an inner circumferential surface of the fixing belt so that heat generated by the heater is easily transmitted to the sheet via the fixing belt (for example, Patent Reference 1).

Patent Reference 1: Japanese Patent Application Publication No. 2020-3611

However, in the conventional fixing device, heat cannot be transferred stably to the fixing belt when printing is performed at high speed, and an image quality may be degraded.

SUMMARY OF THE INVENTION

An object of the present disclosure is to provide a fixing device and an image forming apparatus capable of stabilizing heat transfer to an annular belt and improving an image quality.

A fixing device of the present disclosure includes an annular belt, a heating member disposed to face an inner circumferential surface of the annular belt, and a heat storage member disposed to face a surface of the heating member on a side opposite to the annular belt. A thermal diffusivity of the heat storage member is lower than that of the annular belt.

Since the heat storage member is disposed on the side of the heating member opposite to the fixing belt, and the thermal diffusivity of the heat storage member is lower than that of the annular belt, sufficient heat can be stored in the heat storage member, and a decrease in the temperature of the heat storage member can be prevented.

Therefore, heat can be sufficiently transferred to the annular belt. Further, heat taken away from the annular belt when the sheet passes a fixing nip can be replenished by the heat storage member via the heating member. Thus, the temperature of the annular belt can be made uniform and a gloss difference in an image can be reduced. As a result, the image quality can be improved.

BRIEF DESCRIPTION OF THE DRAWINGS

In the drawings,

FIG. 11 is a diagram for explaining properties of a heat storage member when the number of polyimide films is varied;

DETAILED DESCRIPTION OF THE INVENTION

Embodiments of the present disclosure will be described in detail below with reference to the drawings. Herein, a fixing device and a printer as an image forming apparatus will be described.

Figure 2:
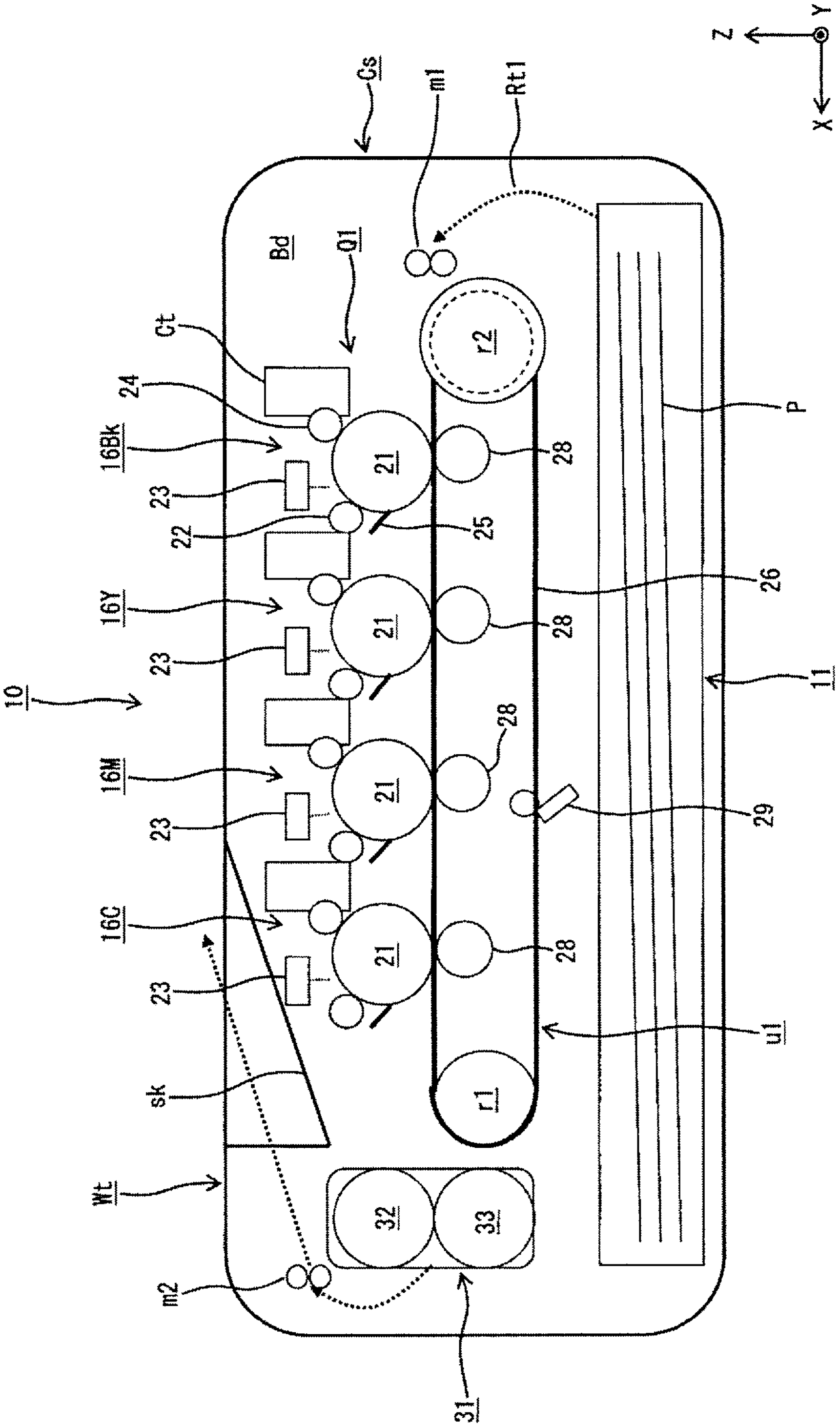
FIG. 2 is a schematic diagram of a printer in the embodiment.

FIG. 2 is a schematic diagram of a printer 10 in the embodiment. In FIG. 2, a +X axis direction is a rearward direction of the printer 10, while a −X axis direction is a frontward direction of the printer 10. A +Y axis direction is a left direction of the printer 10, while a −Y axis direction is a right direction of the printer 10. A +Z-axis direction is an upward direction of the printer 10, while a −Z axis direction is a downward direction of the printer 10.

In FIG. 2, reference numeral 10 denotes the printer, reference numeral Cs denotes a housing of the printer 10, and reference numeral Bd denotes a main body of the printer 10. The housing Cs serves as an enclosure of the printer 10. The main body Bd is also referred to as an apparatus main body.

A sheet cassette 11 as a medium storage container is provided at a lower part of the apparatus main body Bd. Sheets P as media are stacked and stored in the sheet cassette 11. A feed mechanism (not shown) is disposed adjacent to a front end of the sheet cassette 11. The sheets P are separated one by one by the feed mechanism, and each sheet P is fed to a sheet transport path Rt1 as a medium transport path. Then, the sheet P is transported along the sheet transport path Rt1 by a pair of feed rollers m1 as a first transport member. Further, the sheet P is transported to an image forming section Q1 disposed downstream of the pair of feed rollers m1.

The image forming section Q1 includes a plurality of (in this example, four) image forming units 16Bk, 16Y, 16M, and 16C of respective colors (for example, black, yellow, magenta, and cyan), LED heads 23 as exposure devices, and a transfer unit u1.

Each of the image forming units 16Bk, 16Y, 16M, and 16C includes a toner cartridge Ct as a developer storage container, a photosensitive drum 21 as an image bearing body, a charging roller 22 as a charging member, a developing roller 24 as a developer bearing body, and a cleaning blade 25 as a first cleaning member. The toner cartridge Ct stores a toner as a developer. The photosensitive drum 21 is rotatably provided. The charging roller 22 is rotatably provided in contact with the photosensitive drum 21. The developing roller 24 is rotatably provided in contact with the photosensitive drum 21. The cleaning blade 25 is provided so that its tip end is in contact with the photosensitive drum 21. A surface of the photosensitive drum 21 is uniformly charged by the charging roller 22, and is exposed with light emitted by the LED head 23 so that an electrostatic latent image (or a latent image) is formed on the surface of the photosensitive drum 21. The toner supplied from the toner cartridge Ct adheres to the photosensitive drum 21 by the developing roller 24, so that the electrostatic latent image is developed. As a result, a toner image as a developer image of each color is formed on the surface of each photosensitive drum 21.

The transfer unit u1 includes a driving roller r1 as a first roller, a driven roller r2 as a second roller, a transfer belt 26 as a belt member, transfer rollers 28 as transfer members, and a cleaning blade 29 as a second cleaning member. The transfer belt 26 is stretched over the driving roller r1 and the driven roller r2 so that the transfer belt 26 is movable. The transfer roller 28 is rotatably provided to face the photosensitive drum 21 via the transfer belt 26. The cleaning blade 29 is provided so that its tip end is in contact with the transfer belt 26. When a belt motor (not shown) as a driving source for transfer is driven, the driving roller r1 rotates to cause the transfer belt 26 to move.

As the sheet P reaches the image forming section Q1, the sheet P is transported through transfer portions between the photosensitive drums 21 of the image forming units 16Bk, 16Y, 16M, and 16C and the corresponding transfer rollers 28 by the movement of the transfer belt 26. While the sheet P is transported as above, toner images of the respective colors are transferred to the sheet P in an overlapping manner by the transfer rollers 28, and a color toner image is formed on the sheet P.

After the toner images of respective colors are transferred to the sheet P, the toner remaining on each photosensitive drum 21 is scraped off and removed by the cleaning blade 25. Furthermore, the toner, foreign matter and the like adhering to the transfer belt 26 are scraped off and removed by the cleaning blade 29.

A fixing device 31 (or a fuser) is disposed downstream of the image forming section Q1 along the sheet transport path Rt1. The fixing device 31 includes a fixing belt unit 32 as a first fixing member and a pressure roller 33 as a second fixing member or a facing member. The pressure roller 33 is disposed to face the fixing belt unit 32. While the sheet P is transported through a fixing nip Np (FIG. 1) as a fixing portion between the fixing belt unit 32 and the pressure roller 33, the color toner image on the sheet P is heated and melted by the fixing belt unit 32, pressurized by the pressure roller 33, and fixed to the sheet P. The fixing nip Np will be described below.

The sheet P to which the color toner image is fixed in this way is ejected to the outside of the apparatus main body Bd by a pair of ejection rollers m2 as a second transport member, and then placed on a stacker sk provided at a top wall Wt (or a top cover) of the housing Cs.

Next, the fixing device 31 will be described.

Figure 1:
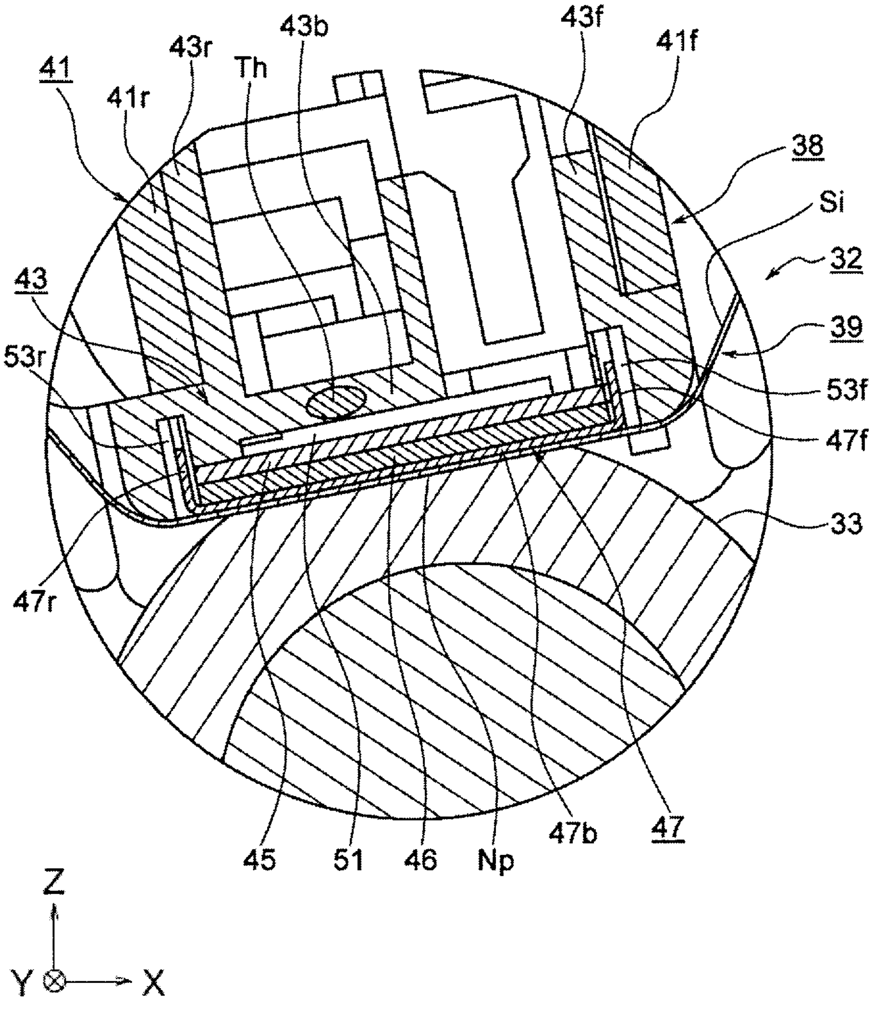
FIG. 1 is a cross-sectional view of a main part of a fixing device in an embodiment.
Figure 3:
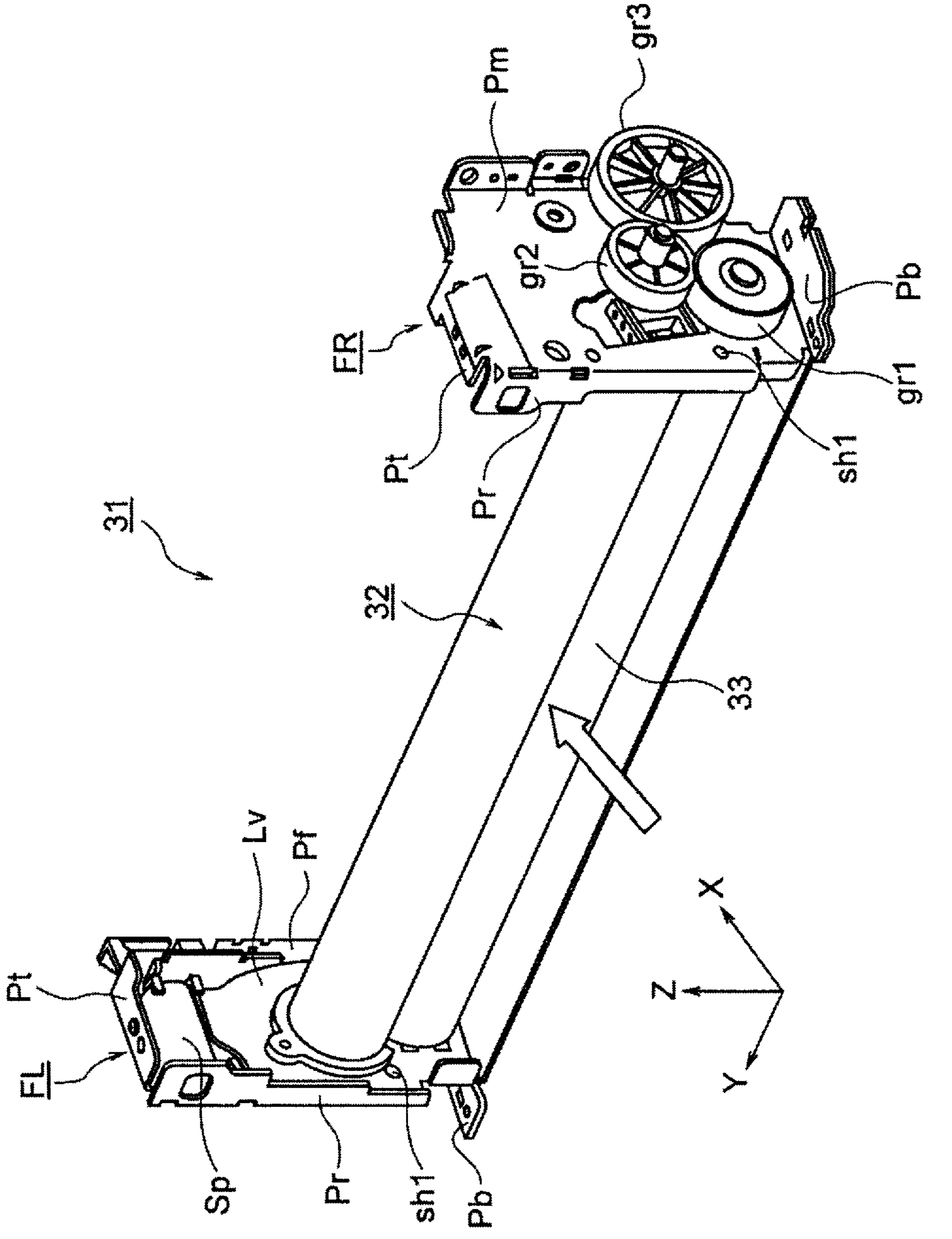
FIG. 3 is a perspective view of the main part of the fixing device in the embodiment.
Figure 4:
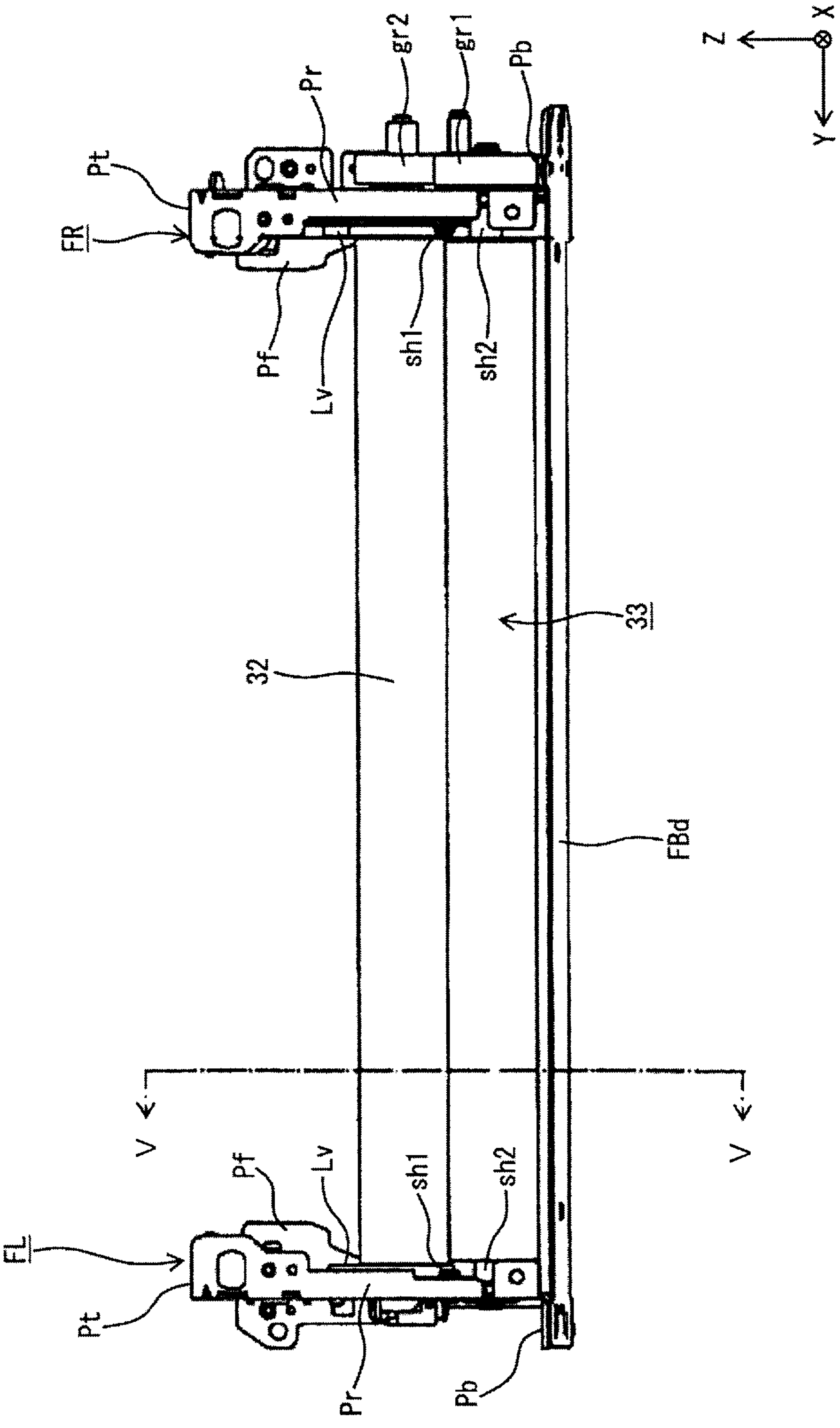
FIG. 4 is a front view of the main part of the fixing device in the embodiment.
Figure 5:
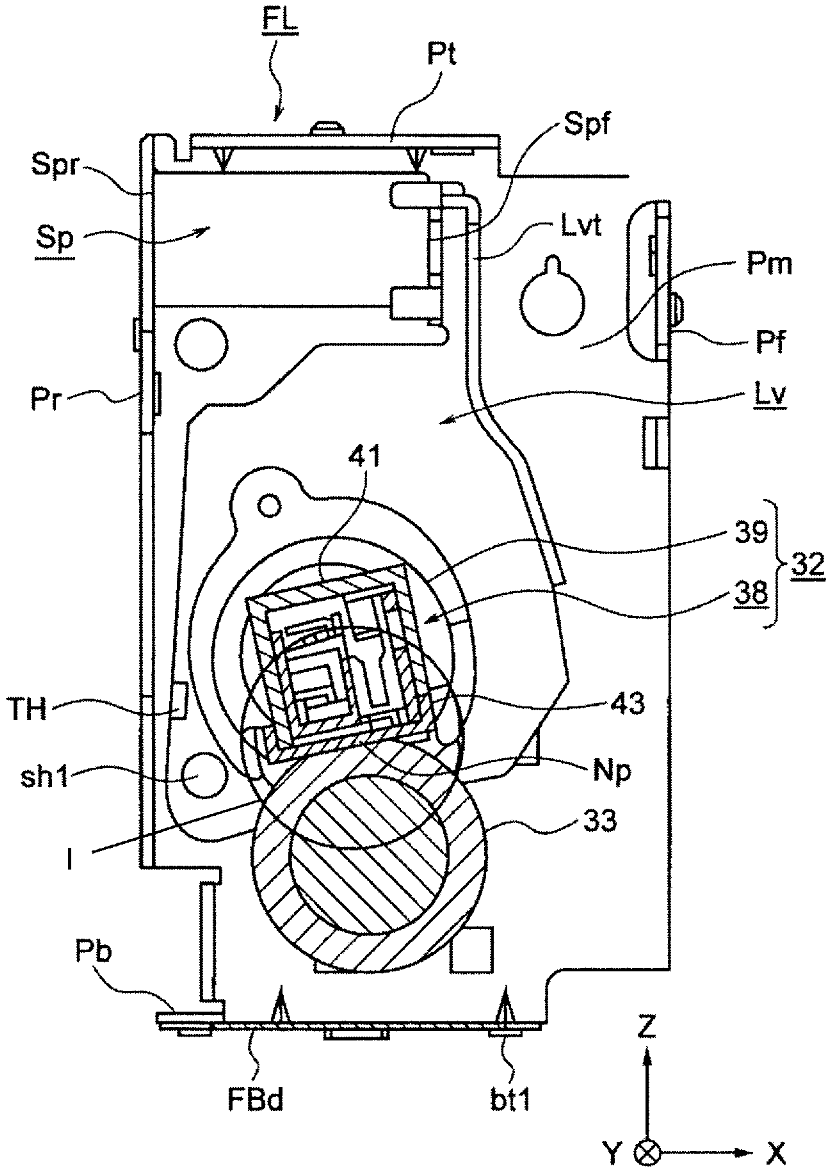
FIG. 5 is a cross-sectional view taken along line V-V in FIG. 4.
Figure 6:
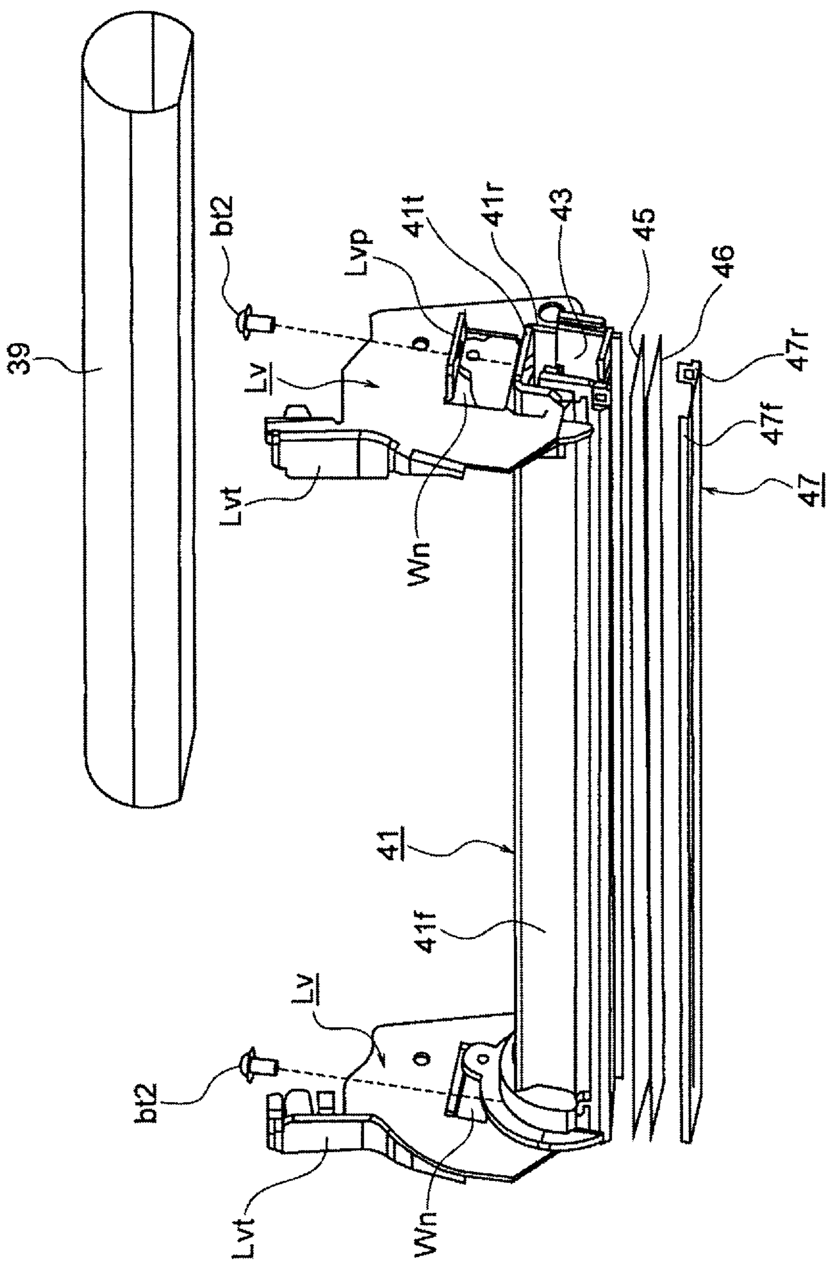
FIG. 6 is an exploded perspective view of the main part of the fixing device in the embodiment.

FIG. 1 is a cross-sectional view of a main part of the fixing device 31 in the embodiment. FIG. 3 is a perspective view of the main part of the fixing device 31 in the embodiment. FIG. 4 is a front view of the main part of the fixing device 31 in the embodiment. FIG. 5 is a cross-sectional view taken along line V-V in FIG. 4. FIG. 6 is an exploded perspective view of the main part of the fixing device 31 in the embodiment. In this regard, FIG. 1 corresponds to an enlarged view of a part encircled by a circle I in FIG. 5. In FIGS. 1, 3 to 5, the +X axis direction is the rearward direction of the printer 10, while the −X axis direction is the frontward direction of the printer 10. However, hereinafter, the +X axis direction is described as a frontward direction of the fixing device 31 (i.e., a transport direction of the sheet P passing through the fixing device 31), while the -X axis direction is a rearward direction of the fixing device 31 (i.e., a direction opposite to the transport direction of the sheet P passing through the fixing device 31). The +Y axis direction is a left direction of the fixing device 31, while the −Y axis direction is a right direction of the fixing device 31. The +Z axis direction is an upward direction of the fixing device 31, while the −Z axis direction is a downward direction of the fixing device 31.

In FIGS. 3 and 4, the fixing device 31 includes a frame FL, a frame FR, levers Lv, the fixing belt unit 32, and the pressure roller 33. The frame FL is disposed on the left side of the printer 10 (FIG. 2) to constitute a part of an enclosure of the fixing device 31. The frame FR is disposed on the right side of the printer 10 to constitute another part of the enclosure of the fixing device 31. The levers Lv are provided on the frames FL and FR so that each lever Lv is pivotal in a plane defined by the X-axis and the Y-axis. The fixing belt unit 32 is provided between the levers Lv. The fixing belt unit 32 is supported by the frames FL and FR so that the fixing belt unit 32 is pivotal together with the levers Lv. The pressure roller 33 is provided between the frames FL and FR below the fixing belt unit 32 and is rotatably supported by the frames FL and FR.

The frames FL and FR are composed of box-shaped bodies whose facing sides are opened. Each of the frames FL and FR includes a main plate Pm. Each of the frames FL and FR further includes a front piece Pf, a rear piece Pr, a top piece Pt, and a bottom piece Pb which are formed by perpendicularly bending the front, back, upper and lower edges of the main plate Pm, respectively. By fixing the bottom piece Pb to a main body frame FBd of the apparatus main body Bd with screws bt1 as fixing members, the fixing device 31 is disposed at a predetermined position in the apparatus main body Bd.

On each of the frames FL and FR, the lever Lv is disposed pivotally about a shaft sh1 within a housing space enclosed by the main plate Pm, the front piece Pf, the rear piece Pr, the top piece Pt, and the bottom piece Pb. The shaft sh1 is provided on the main plate Pm in the vicinity of a corner of the rear piece Pr and the bottom piece Pb. The fixing belt unit 32 is held between the levers Lv.

In FIG. 5, each lever Lv is biased toward the front piece Pf side with a predetermined biasing force generated by a spring Sp as a biasing member. The spring Sp is disposed in the vicinity of the top piece Pt and extends in the front-back direction. A rear end Spr of the spring Sp is attached to the rear piece Pr of each of the frames FL and FR, and a front end Spf of the spring Sp is attached to a locking portion Lvt erected upward from a front edge of the lever Lv.

When the fixing device 31 does not perform fixing, the levers Lv are locked to the frames FL and FR by lever fixing members (not shown) in a state where the springs Sp are compressed against its biasing force, and thereby the levers Lv are held at a predetermined position.

In FIGS. 3 and 4, the pressure roller 33 is located in the vicinity of the bottom pieces Pb. The pressure roller 33 is supported by the main plates Pm of the frames FL and FR so that the pressure roller 33 is rotatable in contact with the fixing belt unit 32. Gears gr1, gr2 and gr3 are disposed in mesh with each other on an outer side of the frame FR. The gear gr1 is attached to a support shaft sh2 of the pressure roller 33. Rotation from a fixing motor (not shown) is transmitted to the gear gr3.

When the fixing device 31 performs fixing, the rotation from the fixing motor is transmitted to the gear gr3 and then transmitted to the gear gr1 via the gear gr2. The lock of the levers LV to the frames FL and FR by the lever fixing members is released by a releasing mechanism (not shown). This causes the lever Lv to pivot in a clockwise direction on the frame FL side (in a counterclockwise direction on the frame FR side) by the biasing force of the spring Sp as shown in FIG. 5.

Thus, the fixing belt unit 32 held between the levers Lv is pressed against the pressure roller 33, causing the sheet P to be sandwiched between the fixing belt unit 32 and the pressure roller 33. As the pressure roller 33 rotates, the sheet P is transported in a direction indicated by an arrow in FIG. 3.

In FIG. 5, the fixing belt unit 32 includes a heating unit 38 serving as a heating source of the fixing belt unit 32, and a fixing belt 39 formed of an annular body to surround the heating unit 38. The fixing belt 39 is also referred to as an annular belt (i.e., an endless belt), and is moved by the rotation of the pressure roller 33.

In FIG. 6, the heating unit 38 includes components provided for heating the toner image on the sheet P. More specifically, the heating unit 38 includes a stay 41, a holding member 43, a heat storage member 45, a heater 46 as a first heating member, and a heat diffusion member 47 as a second heating member. The stay 41 extends in a longitudinal direction (Y axis direction) of the heating unit 38. Both ends of the stay 41 are fixed to the levers Lv. The holding member 43 extends in the longitudinal direction along the stay 41 and is attached to the stay 41. The heat storage member 45, the heater 46, and the heat diffusion member 47 are all held by the holding member 43. Each of the heat storage member 45, the heater 46, and the heat diffusion member 47 has a strip shape and extends in the longitudinal direction.

In the embodiment, the heater 46 generates heat so as to heat the toner image via the fixing belt 39. The heat diffusion member 47 transfers heat generated by the heater 46 to the fixing belt 39 to thereby heat the toner image via the fixing belt 39. The heater 46 and the heat diffusion member 47 are disposed to face an inner circumferential surface Si of the fixing belt 39. The heat storage member 45 is disposed to face a surface of the heater 46 on a side opposite to the fixing belt 39. The heater 46 and the heat diffusion member 47 are also referred to as a heating member.

The stay 41 is made of a resin material. As shown in FIG. 6, the stay 41 has a box shape with its lower end opened. The stay 41 has a top plate 41*t*, a front leg 41*f* hung down from a front edge of the top plate 41*t*, and a rear leg 41*r* hung down from a rear edge of the top plate 41*t*. Both ends of the stay 41 penetrate openings Wn formed in the levers Lv, and protrude toward the frames FL and FR. The protruding portions of the stay 41 are fixed to flaps Lvp by screws bt2 as fixing members. Each flap Lvp is formed by bending an upper edge of the opening Wn of the lever Lv laterally.

The holding member 43 is made of a metal and has a box shape with its upper end opened. As shown in FIG. 1, the holding member 43 has a bottom plate 43*b*, a front arm 43*f* erected from a front edge of the bottom plate 43*b*, and a rear leg 43*r* erected from a rear edge of the bottom plate 43*b*. The holding member 43 is attached to the stay 41 by fitting the front arm 43*f* and the rear leg 43*r* to the inside of the stay 41 from below.

A concave portion having a rectangular shape is formed at a lower surface of the holding member 43 so as to face the inner circumferential surface Si of the fixing belt 39 and to face the pressure roller 33 via the fixing belt 39. This concave portion serves as a housing space 51 in which the heat storage member 45, the heater 46, and the heat diffusion member 47 are housed in this order from above in an overlapping manner.

In addition, a thermistor Th is disposed on the bottom plate 43*b* of the holding member 43 so as to face the housing space 51. The thermistor Th serves as a temperature detecting element for detecting a temperature of the heater 46 in a non-contact manner. In the embodiment, the thermistor Th is configured to detect the temperature of the heater 46 indirectly via the heat storage member 45. However, it is also possible to directly detect the temperature of the heater 46 using a contact-type element such as a contact-type thermistor.

Furthermore, in order to detect a temperature of a surface layer 39*c* (FIG. 8) of the fixing belt 39 as described later, a temperature sensor TH (FIG. 5) as a non-contact type temperature detector is disposed in the vicinity of the shaft sh1 in the lever Lv so that the temperature sensor TH faces the fixing belt 39. The heater 46 is turned on and off based on a difference between a temperature detected by the temperature sensor TH (i.e., a detected temperature) and a target temperature, thereby performing a warming-up operation of the fixing device 31.

As shown in FIG. 1, each of the heat storage member 45 and the heater 46 has a flat shape. The heat diffusion member 47 includes a contact portion 47*b* formed to contact the inner circumferential surface Si of the fixing belt 39, and erected pieces 47*f* and 47*r* as first and second engaging portions that are erected from the front and rear edges of the contact portion 47*b*, respectively. Furthermore, grooves 53*f* and 53*r* as first and second to-be-engaged portions are formed at portions of the bottom plate 43*b* of the holding member 43 corresponding to the erected pieces 47*f* and 47*r*, respectively, in such a manner that the grooves 53F and 53*r* are opened downward.

Therefore, the erected pieces 47*f* and 47*r* are inserted into the grooves 53*f* and 53*r*, respectively. Thus, the heat diffusion member 47 is disposed movably in the vertical direction in such a manner that the heat diffusion member 47 surrounds the heat storage member 45 and the heater 46. The heat storage member 45 and the heater 46 provided between the holding member 43 and the heat diffusion member 47 are movable vertically without being restricted by the holding member 43 and the heat diffusion member 47.

As described above, when the fixing belt unit 32 is pressed against the pressure roller 33, the contact portion 47*b* of the heat diffusion member 47 is brought into contact with the fixing belt 39 so that the fixing nip Np is formed between the heat diffusion member 47 and the pressure roller 33 via the fixing belt 39.

The heat diffusion member 47 is made of a metal plate of stainless steel, aluminum, an aluminum alloy, or iron or the like, so as to efficiently transfer the heat of the heater 46 to the fixing belt 39. A surface of the metal plate facing the inner circumferential surface Si of the fixing belt 39 is coated with a material having a low coefficient of friction and high wear resistance. For example, the surface of the metal plate may be subjected to glass coating, hard chrome plating, fluorine resin coating, and polyamide-imide coating, so that the surface is not deformed by rubbing against a base material layer 39*a* (FIG. 8) constituting the inner circumferential surface Si of the fixing belt 39.

In the embodiment, a metal plate made of aluminum is used for the thermal diffusion member 47 and a surface of the metal plate is coated with polyamide-imide to which graphite is added. A blending ratio of graphite to polyamide-imide is 11 [weight %]. A thickness of the coating is 10 [μm]. In order to efficiently transfer the heat stored in the heat storage member 45 to the fixing belt 39, a thermal diffusivity of the heat diffusion member 47 is preferably higher than that of the heat storage member 45. In the embodiment, the thermal diffusivity of the heat diffusion member 47 is $4.56\times10^{-6}$ [$m^2$/s].

Thermal conductive grease is applied between the heater 46 and the heat diffusion member 47 to efficiently transfer the heat of the heater 46 to the heat diffusion member 47. It is noted that thermal conductive grease may also be applied between the heat storage member 45 and the heater 46. Furthermore, sliding grease is applied to a sliding portion between the heat diffusion member 47 and the fixing belt 39 in order to enhance slidability and prevent wear of the heat diffusion member 47 and the fixing belt 39.

Next, the heater 46 will be described.

Figure 7:
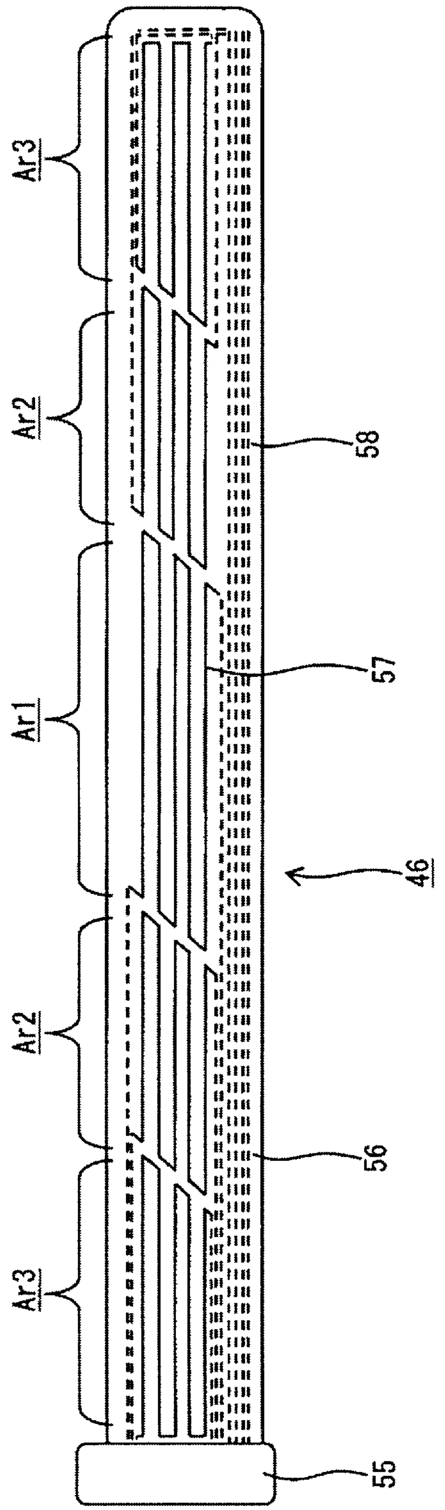
FIG. 7 is a plan view of a heater in the embodiment.

FIG. 7 is a plan view of the heater 46 in the embodiment.

In FIG. 7, the heater 46 includes a connector 55, heating sections Ari (i=1, 2, and 3), conducting heat generating elements 57, and lead wires 58. The connector 55 is disposed at one end of the heater 46. The heating sections Ari are formed at a plurality of locations on a substrate 56, specifically five locations in the embodiment, by printing or embedding. The conducting heat generating element 57 is disposed in each heating section Ari while meandering and generates heat by application of current. The lead wires 58 are disposed between the connector 55 and both ends of each conducting heat generating element 57 and supply power to the corresponding heating section Ari.

Among the heating sections Ari, the heating section Ar1 is disposed at a center of the heater 46 in the longitudinal direction. The heating sections Ar2 are disposed on both sides of the heating section Ar1. The heating sections Ar3 are disposed on both sides (more specifically, outer sides) of the heating section Ar2. Power is selectively supplied to the heating sections Ari according to a width of the sheet P. For example, when printing is performed on a narrow sheet P such as a postcard, power is supplied only to the central heating section Ar1. When printing is performed on a wide sheet P such as an A4 sheet P in a transverse feed (or an A3 sheet P in a longitudinal feed), power is supplied to all heating sections Ar1, Ar2 and Ar3. Since the heating sections Ari are selected according to the sheet P to be used, the power can be saved.

In the embodiment, a boundary portion between each adjacent two of the heating sections Ari is inclined in the longitudinal direction of the heater 46, and thus it is possible to suppress a change in the temperature between the heating section Ari and its adjacent boundary portion.

Next, the fixing belt 39 will be described.

Figure 8:
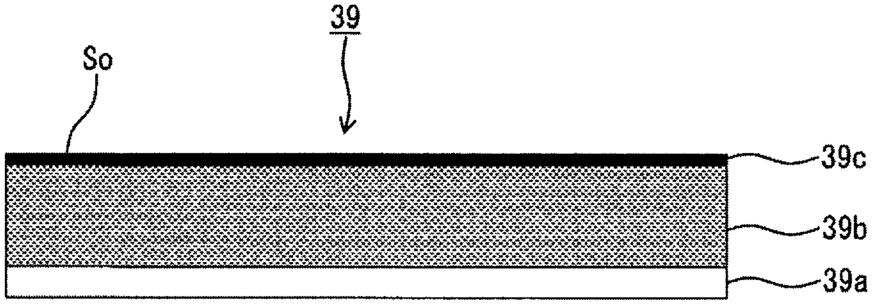
FIG. 8 is a cross-sectional view of a fixing belt in the embodiment.

FIG. 8 is a cross-sectional view of the fixing belt 39 in the embodiment.

In FIG. 8, the fixing belt 39 includes at least three layers, namely, the base material layer 39*a*, a resilient layer 39*b* formed on the base material layer 39*a*, and the surface layer 39*c* formed on the resilient layer 39*b*.

The base material layer 39*a* has high mechanical strength and high durability so as to withstand repeated bending, buckling, or the like in order that the fixing belt 39 is able to move without breakage throughout its lifetime.

For this reason, in the embodiment, the base material layer 39*a* is made of polyimide (PI), and has a diameter of 30 [mm] and a thickness of 80 [μm]. For the base material layer 39*a*, it is possible to use a base material having high heat resistance so as to withstand a fixing temperature, exhibits high durability against bending, buckling, and the like, and has a predetermined Young's modulus. Examples of such a base material include SUS430, polyether ether ketone (PEEK), and the like. If necessary, fillers made of polytetrafluoroethylene (PTFE), boron nitride or the like may be added to the base material in order to enhance slidability, thermal conductivity or the like. Furthermore, electric conductive fillers containing carbon black, zinc or other metallic elements may be added to the base material so that the base material layer 39*a* has electric conductivity.

The resilient layer 39*b* has appropriate rubber hardness and thickness in order to form the fixing nip Np and to efficiently transfer heat from the heating unit 38 to an outer circumferential surface (toner contact surface) So of the fixing belt 39 while suppressing the dissipation of heat. If the resilient layer 39*b* is extremely thick, a uniform fixing nip Np can be formed, but a heat capacity of the resilient layer 39*b* increases, resulting in a large heat loss. Thus, the thickness of the resilient layer 39*b* is preferably 50 [μm] or thicker and 500 [μm] or thinner. The rubber hardness of the resilient layer 39*b* is preferably 20 [degrees] or higher and 60 [degrees] or lower so as to form the fixing nip Np uniformly. In the embodiment, the thickness of the resilient layer 39*b* is 300 [μm], and the rubber hardness is 20 [degrees]. Silicone rubber is used as a material of the resilient layer 39*b* in order to enhance the heat resistance of the resilient layer 39*b* so as to withstand the fixing temperature. The material of the resilient layer 39*b* is not limited to silicone rubber, and any material capable of withstanding the fixing temperature, for example, fluoro rubber may be used.

The surface layer 39*c* is generally desired to be thin so that the surface layer 39*c* is deformable according to deformation of the resilient layer 39*b*. However, if the surface layer 39*c* is extremely thin, wrinkles may occur on its surface due to rubbing against the pressure roller 33, the sheet P, or the like. Thus, the thickness of the surface layer 39*c* is preferably 9 [μm] or thicker and 50 [μm] or thinner. In the embodiment, the thickness of the surface layer 39*c* is set to 20 [μm]. The surface layer 39*c* is desired to have high heat resistance so as to withstand the fixing temperature. In addition, the surface layer 39*c* is desired to have high releasability so that the toner of the toner image fixed to the sheet P is less likely to adhere to the surface layer 39*c*.For this reason, the surface layer 39*c* is made of fluorine-substituted material. In the embodiment, tetrafluoroethylene-perfluoroalkoxy ethylene copolymer (PFA) is used for the surface layer 39*c*.

Next, the pressure roller 33 will be described.

Figure 9:
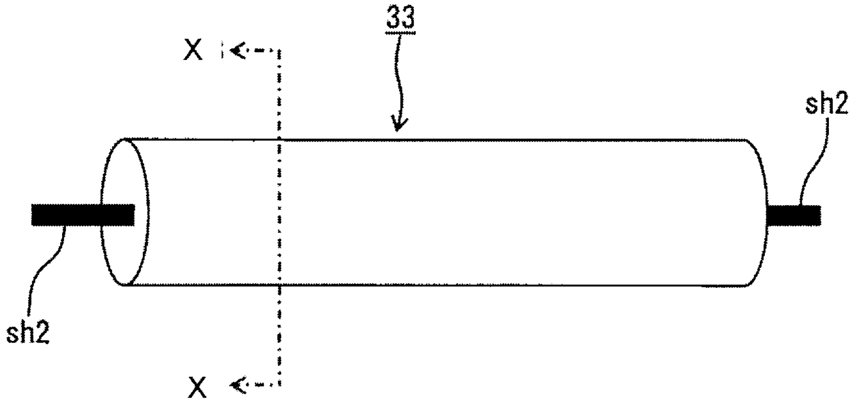
FIG. 9 is a perspective view of a pressure roller in the embodiment.
Figure 10:
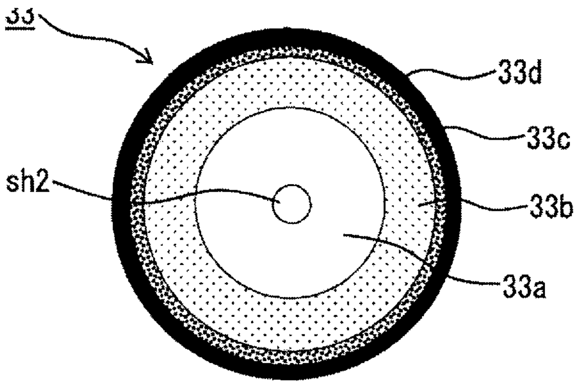
FIG. 10 is a cross-sectional view taken along line X-X in FIG. 9.

FIG. 9 is a perspective view of the pressure roller 33 in the embodiment. FIG. 10 is a cross-sectional view taken along line X-X in FIG. 9.

The pressure roller 33 includes at least four layers, namely, a shaft 33*a*, a resilient layer 33*b*, an adhesive layer 33*c*, and an outer circumferential surface layer 33*d*. The shaft 33*a* has the support shaft sh2 protruding on both ends thereof. The resilient layer 33*b* is formed on an outer surface of the shaft 33*a*.The adhesive layer 33*c* is formed on an outer surface of the resilient layer 33*b*. The outer circumferential surface layer 33*d* is formed on an outer surface of the adhesive layer 33*c*. It is also possible to provide an adhesive layer between the shaft 33*a* and the resilient layer 33*b* as needed.

In the embodiment, the pressure roller 33 has an outer diameter of 40 [mm]. The pressure roller 33 has an inverted crown shape such that an outer diameter of a center of the pressure roller 33 in the axial direction is smaller than an outer diameter of each end of the pressure roller 33 in the axial direction by 0.2 [mm]. The pressure roller 33 has a hardness of 50 [degrees] or higher and 65 [degrees] or lower.

The shaft 33*a* is made of a material that withstands a pressure applied when fixing is performed. In the embodiment, a hollow shaft made of stainless steel (SUS304) is used as the shaft 33*a*, but a solid shaft may also be used as the shaft 33*a*.

The resilient layer 33*b* is desired to have appropriate rubber hardness and thickness so as to form the fixing nip Np, as is the case with the resilient layer 39*b* of the fixing belt 39. Further, the resilient layer 33*b* is desired to have heat storage properties sufficient to prevent dissipation of heat transferred from the fixing belt 39 to the sheet P and the toner image thereon. Although the resilient layer 33*b* may be made of solid rubber as is the case with the resilient layer 39*b* of the fixing belt 39, the resilient layer 33*b* in the embodiment is made of a silicone sponge having foam cells for the above-described reason. In order to prevent a nip mark from being formed by pressure applied to the fixing nip Np, cell diameters of foam cells are preferably small, and an average cell diameter is preferably 20 [μm] or larger and 250 [μm] or smaller. In the embodiment, a silicone rubber having an average cell diameter of about 100 [μm] is used. The cell diameter is determined by cutting the silicone rubber in its thickness direction with a razor or the like, observing the cut surface with a CCD microscope, measuring cell diameters of 10 cells in a field of view, and then averaging the measured cell diameters. The silicone rubber has a thickness of 4 [mm]. Further, in the embodiment, in order to suppress electrostatic adhesion of paper dust or other materials to the pressure roller 33 due to electric charge accumulated in the pressure roller 33 during continuous printing, an electric conductive agent is added to the silicone rubber. It is noted that the electric conductive material is not necessarily added to the resilient layer 33*b*.

The adhesive layer 33*c* is used to prevent peeling off of the outer circumferential surface layer 33*d* from the resilient layer 33*b* and generation of wrinkles or the like. Thus, in the embodiment, a silicone adhesive, which has high adhesive strength and excellent resistance to the fixing temperature, is used as the adhesive layer 33*c*. In order to suppress the adhesion of paper dust or other materials to the pressure roller 33 during continuous printing, an electric conductive agent may be added to the silicone adhesive, or alternatively an electric conductive adhesive may be used.

The outer circumferential surface layer 33*d* is generally desired to be thin so that the outer circumferential surface layer 33*d* is deformable according to deformation of the resilient layer 33*b*. However, if the outer circumferential surface layer 33*d* is extremely thin, wrinkles may occur on its surface due to rubbing against the sheet P (mainly paper), the fixing belt 39, and the like. Thus, the thickness of the outer circumferential surface layer 33*d* is preferably 15 [μm] or thicker and 50 [μm] or thinner. In the embodiment, the thickness of the outer circumferential surface layer 33*d* is set to 30 [μm]. The outer circumferential surface layer 33*d* is also desired to have high heat resistance so as to withstand the fixing temperature. In addition, the outer circumferential surface layer 33*d* is desired to have high releasability so that the toner of the toner image fixed to the sheet P is less likely to adhere to the outer circumferential surface layer 33*d*. For this reason, the outer circumferential surface layer 33*d* is made of fluorine-substituted material. In the embodiment, tetrafluoroethylene-perfluoroalkoxy ethylene copolymer (PFA) is used for the outer circumferential surface layer 33*d*.

As described above, in the embodiment, the heat diffusion member 47 is disposed to face the inner circumferential surface Si of the fixing belt 39 so that the heat generated by the heater 46 is easily transferred to the fixing belt 39.

However, if heat cannot be sufficiently transferred from the heater 46 to the fixing belt 39 during printing at high speed, a temperature of the fixing belt 39 varies between a first turn and a second turn of the fixing belt 39. This increases a difference in glossiness (hereinafter referred to as a gloss difference) between image portions on the sheet P formed in the first turn and the second turn of the fixing belt 39, and thus an image quality may be degraded.

If a heat capacity of the fixing belt 39 is large, power consumption by the heater 46 increases, and a warming-up time increases. Thus, a standby time after the printer 10 is turned on until printing starts increases. For this reason, it is conceivable to reduce the heat capacity of the fixing belt 39 by reducing the thickness of the resilient layer 39*b* of the fixing belt 39. However, if the heat capacity of the fixing belt 39 is set extremely small, a heat storage capacity of the fixing belt 39 decreases. In this case, a change in the temperature of the fixing belt 39 between the first turn and the second turn of the fixing belt 39 increases, and the gloss difference between the image portions formed in the first turn and the second turn of the fixing belt 39 increases.

Thus, in the embodiment, the heat storage member 45 is provided for the heater 46. The heat storage member 45 replenishes heat to the fixing belt 39 whose temperature decreases due to the passage of the sheet P. In addition, a thermal diffusivity of the heat storage member 45 is lower than that of the fixing belt 39, and thus sufficient heat can be stored in the heat storage member 45.

Next, the heat storage member 45 will be described.

The heat storage member 45 in the embodiment is formed by laminating polyimide resin films (hereinafter referred to as "polyimide films") onto the heater 46. In other words, the heat storage member 45 is formed by bonding the polyimide films onto the heater 46 in an overlapping manner. Each polyimide film has a thickness of about 70 [μm]. The polyimide film is, for example, "heat resistant polyimide tape" manufactured by 3M Japan Limited. Each polyimide film is smaller than the substrate 56 of the heater 46 (FIG. 7), but has a dimension of 250 [mm] in the longitudinal direction and a dimension of 15 [mm] in the widthwise direction so as to cover the heating sections Ari.

As the number of laminated polyimide films on the heater 46 increases, a heat capacity of the heat storage member 45 increases.

Next, properties of the heat storage member 45 when the number of polyimide films is varied will be described.

Figure 12:
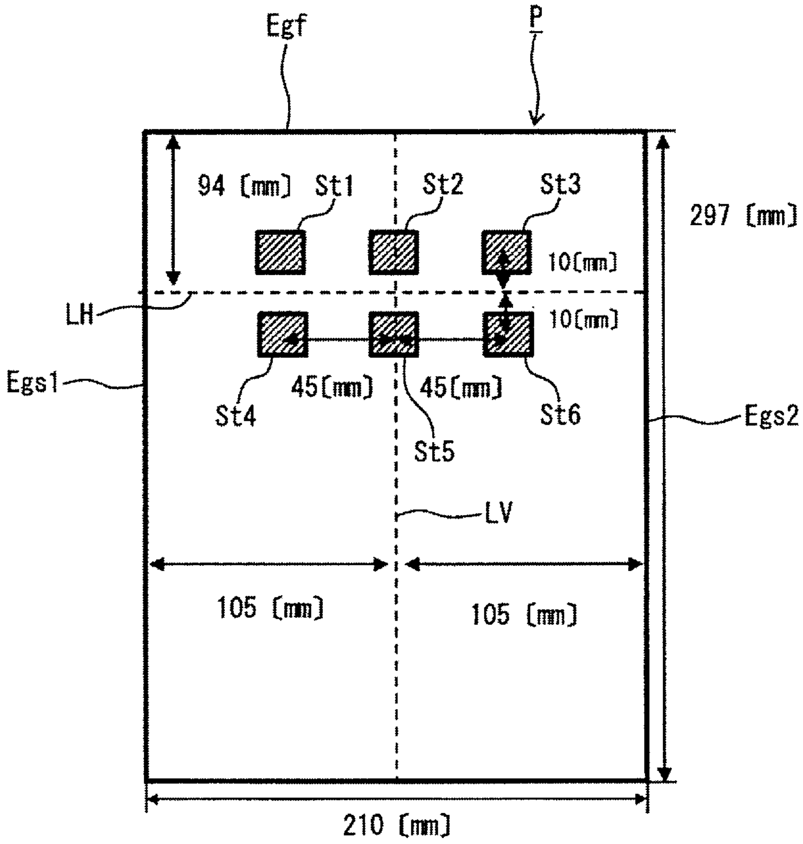
FIG. 12 is a diagram for explaining a measurement method of a glossiness.
Figure 13:
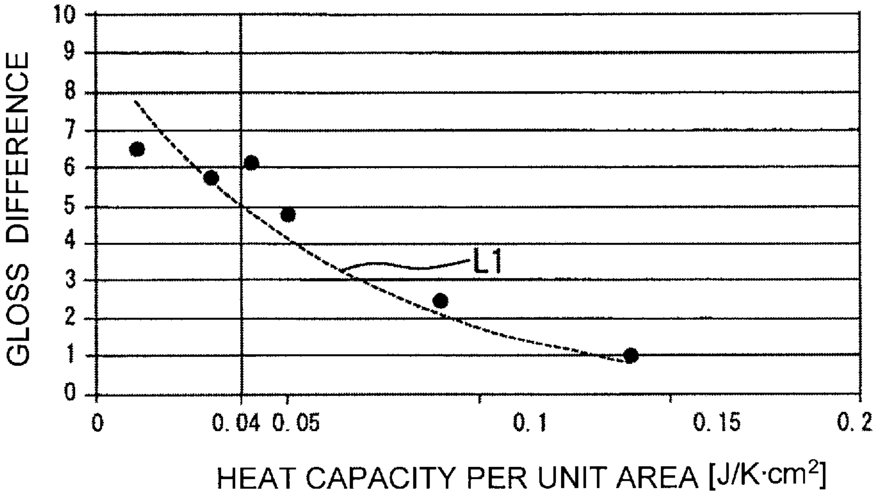
FIG. 13 is a diagram illustrating a relationship between a heat capacity per unit area of the polyimide film and a gloss difference.
Figure 14:
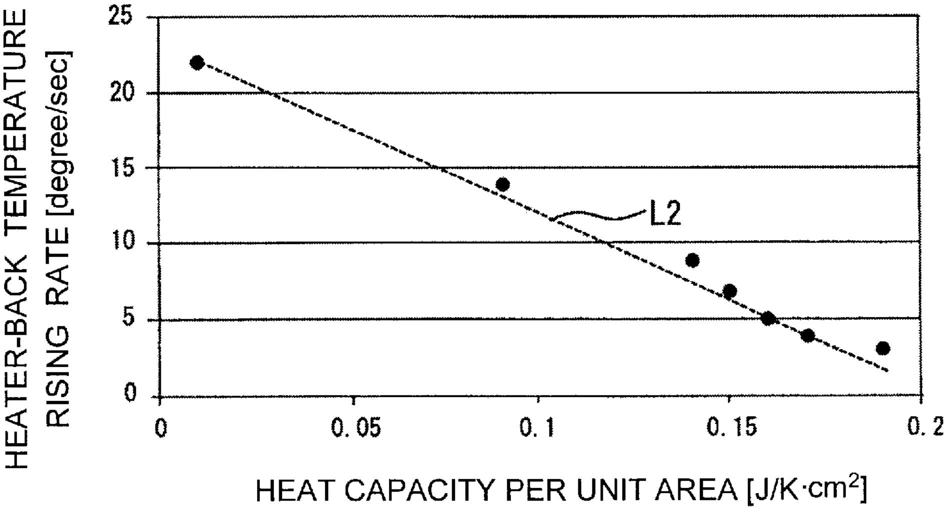
FIG. 14 is a diagram illustrating a relationship between the heat capacity per unit area of the polyimide film and a heater-back temperature rising rate.
Figure 15:
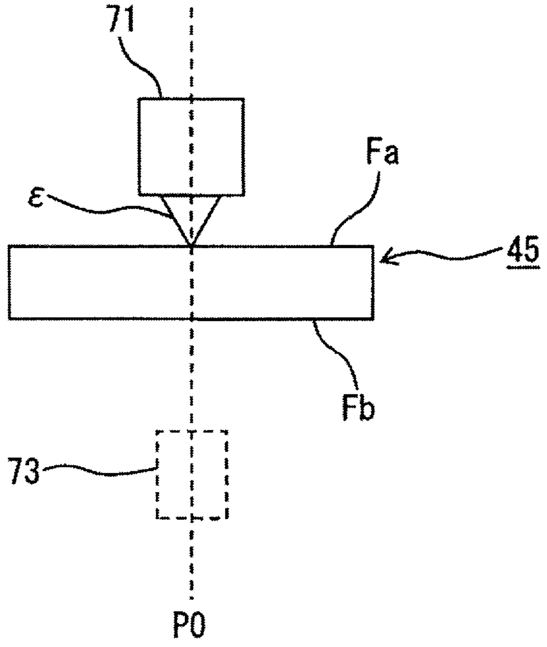
FIG. 15 is a diagram for explaining a measurement method of a thermal diffusivity.

FIG. 11 is a table for explaining the properties of the heat storage member 45 when the number of polyimide films is varied. FIG. 12 is a diagram for explaining a measurement method of the glossiness. FIG. 13 is a diagram illustrating a relationship between a heat capacity per unit area of the polyimide film and the gloss difference. FIG. 14 is a diagram illustrating a relationship between the heat capacity per unit area of the polyimide film and a heater-back temperature rising rate. FIG. 15 is a diagram for explaining a measurement method of the thermal diffusivity. In FIG. 13, the horizontal axis indicates the heat capacity per unit area, while the vertical axis indicates the gloss difference. In FIG. 14, the horizontal axis indicates the heat capacity per unit area, while the vertical axis indicates the heater-back temperature rising rate. In this regard, FIG. 11 also shows properties of heat storage members of Comparative Examples 1 and 2 which are made of copper and aluminum, respectively.

FIG. 11 illustrates the thicknesses, the heat capacities, the heat capacities per unit area, the gloss differences, the warming-up times, the heater-back temperature rising rates, and the thermal diffusivities of the heat storage member 45 when the number of polyimide films is set to 1, 3, 4, 5, 10, 15 to 18, and 20.

The heat capacity of the heat storage member 45 was determined as follows. Measurements were performed by a differential scanning calorimeter (DSC) method using a DSC ("DSC6220" manufactured by SII Nano Technology Inc.) to obtain a DSC curve. A specific heat capacity Cps of the polyimide film was calculated based on the DSC curve. Then, the specific heat capacity Cps was multiplied by the weight of the heat storage member 45, so that the heat capacity of the heat storage member 45 was obtained.

In the measurements, alumina was used as a reference material. A measured weight of the alumina was 10.3 [mg], and a measured weight of the polyimide film was 11.9 [mg]. The specific heat capacity Cps of the polyimide film was calculated using the following formula.

$$Cps=(H/h)\cdot(mr/ms)\cdot Cpr$$

In this formula, "H" denotes a difference between the DSC curves of the polyimide film and an empty container. "h" denotes a difference between the DSC curves of the alumina (reference material) and the empty container. "mr" denotes a weight of the alumina. "ms" denotes a weight of the polyimide film. "Cpr" denotes a specific heat capacity of the alumina.

In a state where the printer 10 was left in an environment at a room temperature of 25 [° C.], the specific heat capacity Cps of one polyimide film was 1.03 [J/gK], the weight per polyimide film was 0.34 [g], and the dimensions of the polyimide film was 250 [mm]×15 [mm]. Thus, the heat capacity per unit area of one polyimide film was 0.0093 [J/K·cm$^2$].

Therefore, when the number of the polyimide films was set to 1, 3, 4, 5, 10, 15 to 18, and 20, the heat capacities of the heat storage member 45 were 0.35 [J/K], 1.05 [J/K], 1.40 [J/K], 1.75 [J/K], 3.50 [J/K], 5.25 [J/K], 5.60 [J/K], 5.95 [J/K], 6.30 [J/K], and 7.00 [J/K], respectively. Thus, the heat capacities per unit area of the heat storage members 45 were 0.01 [J/K·cm$^2$], 0.03 [J/K·cm$^2$], 0.04 [J/K·cm$^2$], 0.05 [J/K·cm$^2$], 0.09 [J/K·cm$^2$], 0.14 [J/K·cm$^2$], 0.15 [J/K·cm$^2$], 0.16 [J/K·cm$^2$], 0.17 [J/K·cm$^2$], and 0.19 [J/K·cm$^2$], respectively.

The thermal diffusivity of the heat storage member 45 is the thermal diffusivity of polyimide which is the material of the film. Regardless of the number of films, the thermal diffusivity of the heat storage member 45 is $0.302\times10^{-6}$ [m$^2$/s].

The gloss difference was measured by transporting one sheet P of A4 size (297 [mm]×210 [mm]) ("Excellent White" manufactured by Oki Electric Industry Co., Ltd, and having a basis weight of 80 [g/m$^2$]) at a speed of 162 [mm/s] in a longitudinal feed and printing a blue image whose image density was 200 [%] (i.e., a magenta image whose image density was 100 [%] and a cyan image whose image density was 100 [%]) on the sheet P. The glossiness was measured at six measurement positions Stj (j=1, 2, . . . , 6) on the sheet P using "micro-gloss 75°" manufactured by BYK-Gardner Inc., according to "75° specular gloss measuring method (JIS P8142)" as illustrated in FIG. 12.

The fixing belt 39 having a diameter of 30 [mm] was used in the fixing device 31 in the embodiment. A virtual boundary line LH was defined as a line extending in a lateral (widthwise) direction and distanced 94 [mm] from a leading (front) edge Egf of the sheet P. An area from the leading edge Egf of the sheet P to the boundary line LH corresponds to the first turn of the fixing belt 39, while an area on a rear side of the boundary line LH corresponds to the second turn of the fixing belt 39.

A center line LV was defined as a line extending in the longitudinal direction and distanced 105 [mm] from each of left and right edges Egs1 and Egs2 of the sheet P. A measurement position St1 was defined at a position distanced 45 [mm] to the left from the center line LV and distanced 10 [mm] to the front from the boundary line LH. A measurement position St2 was defined at a position on the center line LV and distanced 10 [mm] to the front from the boundary line LH. A measurement position St3 was defined at a position distanced 45 [mm] to the right from the center line LV and distanced 10 [mm] to the front from the boundary line LH. A measurement position St4 was defined at a position distanced 45 [mm] to the left from the center line LV and distanced 10 [mm] to the rear from the boundary line LH. A measurement position St5 was defined at a position on the center line LV and distanced 10 [mm] to the rear from the boundary line LH. A measurement position St6 was defined at a position distanced 45 [mm] to the right from the center line LV and distanced 10 [mm] to the rear from the boundary line LH.

Then, an average of glossinesses measured at the measurement positions St1 to St3 was defined as a first glossiness of an image formed by the first turn of the fixing belt 39, and an average of glossinesses measured at the measurement positions St4 to St6 was defined as a second glossiness of an image formed by the second turn of the fixing belt 39. The gloss difference was defined as a difference between the first glossiness and the second glossiness.

The gloss differences when the number of polyimide films was set to 1, 3, 4, 5, 10, and 15 were 6.5, 5.8, 6.1, 4.8, 2.5, and 1.0, respectively. It is found that, when the number of polyimide films is 1, 3, or 4, the gloss difference is large. In contrast, when the number of polyimide films is 5, 10, or 15, the gloss difference is small.

Therefore, as the number of polyimide films increases, the heat capacity of the heat storage member 45 increases, and thus the heat storage member 45 is able to store (hold) much more heat transferred from the heater 46. Even if the heat of the fixing belt 39 is taken away by the sheet P during the first turn of the fixing belt 39 due to the passage of the sheet P, heat stored in the heat storage member 45 is transferred to the fixing belt 39 via the heater 46. Consequently, heat can be stably transferred to the sheet P even in the second turn of the fixing belt 39.

The warming-up time was measured by detecting the temperature of the surface layer 39*c* of the fixing belt 39 using the non-contact temperature sensor TH, and measuring the time required for the temperature of the surface layer 39*c* to rise from the room temperature (30 [° C.] or lower) to 140 [° C.] after the heater 46 was turned on.

The warming-up time was measured based on the detected temperature of the surface layer 39*c* of the fixing device 31 while changing the number of polyimide films constituting the heat storage member 45. For this purpose, a multi-input data logger ("NR-500" manufactured by Keyence Corp.) as a data monitoring device was connected to the temperature sensor TH, whereby the temperature of the surface layer 39*c* of the fixing device 31 was detected, and the warming-up time was measured.

The warming-up times when the number of polyimide films was set to 1, 10, and 15 were 7.73 [sec], 7.53 [sec], and 7.40 [sec], respectively.

When the number of polyimide films is 10, the thickness of the heat storage member 45 is thick, and thus the thermal insulation property of the heat storage member 45 increases, as compared to when the number of polyimide films is 1. Thus, if the transfer of heat from the heater 46 to the fixing belt 39 is improved by a heat insulation effect of the heat storage member 45, heat of the heater 46 should be quickly transferred to the fixing belt 39 and the warming-up time should be shortened when the number of polyimide films is 10.

However, the warming-up time required for the detected temperature of the surface layer 39*c* to rise from the room temperature to 140 [° C.] is 7.73 [sec] when the number of the polyimide films is 1, and is 7.53 [sec] when the number of polyimide films is 10. These warming-up times are substantially the same as each other.

From this result, it cannot be said that the transfer of heat from the heater 46 to the fixing belt 39 is improved by the heat insulation effect of the heat storage member 45.

Further, for example, if the gloss difference is 5.0 or larger, an operator can visually recognize the gloss difference in a printed image on the sheet P. As can be seen from FIG. 11, when the number of polyimide films is 1, the gloss difference is 6.5, and the warming-up time is 7.73 [sec]. On the other hand, when the number of polyimide films is 10, the gloss difference is 2.5, and the warming-up time is 7.53 [sec]. That is, the warming-up times are substantially the same values even when the gloss differences are different from each other. Thus, it is considered that the gloss difference is not optimized by the heat insulation effect of the heat storage member 45 described above, but optimized by a heat storage effect of the heat storage member 45, i.e., the effect that the heat storage member 45 stores heat transferred from the heater 46.

This can be interpreted as follows. Even if the temperature of the fixing belt 39 decreases during the first turn, a decrease in the temperature of the heater 46 is suppressed by the heat storage member 45. In addition, the heater 46 receives heat from the heat storage member 45, and supplies a large amount of heat to the fixing belt 39. That is, it is understood that the gloss difference is not only caused by a decrease in the temperature of the fixing belt 39, but also caused by a decrease in the temperature of the heater 46.

Next, the heater-back temperature rising rate will be described.

The heater-back temperature rising rate is a rising rate of the temperature of a backside of the heater 46, i.e., the temperature detected by the thermistor Th. The heater-back temperature rising rate is monitored in order to prevent breakage of the holding member 43 due to its overheating by the heater 46.

When the number of polyimide films was changed to 1, 10, 15 to 18, and 20, the heater-back temperature rising rates were 22.1 [° C./s], 13.8 [° C./s], 8.8 [° C./s], 6.8 [° C./s], 5.0 [° C./s], 4.0 [° C./s], and 2.9[° C./s], respectively.

It is understood that, when the number of polyimide films increases from 1 to 10, 15 to 18 and 20, the heat becomes less likely to be transferred from the heater 46 to the thermistor Th, and thus the heater-back temperature rising rate decreases.

The heater-back temperature rising rate is used to monitor the temperature rising rate in order to prevent the breakage of the holding member 43 due to its overheating as described above. However, the heater-back temperature rising rate is also used to check whether the heater 46 is activated or not. If the heater-back temperature rising rate is extremely low, it cannot be checked whether the heater 46 is activated or not. Therefore, the heater-back temperature rising rate is desired to be 5.0 [° C./sec] or higher.

As shown in Comparative Example 2 in FIG. 11, when the heat storage member 45 is made of aluminum, heat of the heater 46 is transmitted to the thermistor Th more easily because the thermal diffusivity of aluminum is higher than that of the polyimide film, and thus it becomes easy to monitor the heater-back temperature rising rate. However, a gloss difference is 6.5 when the heat storage member 45 is made of aluminum, which degrades the image quality. This is considered to be because the thermal diffusivity of aluminum is higher than that of the fixing belt 39, and the heat from the heater 46 is released to the outside without being stored in the heat storage member 45.

When the values of the heat capacity per unit area and the gloss difference obtained while changing the number of polyimide films are plotted, the following exponential function is obtained:

$$y=9.3454e^{-15.24x}$$

where x is the heat capacity per unit area, and y is the gloss difference. This exponential function is indicated by line L1 in FIG. 13.

When $R^2$ is defined as a coefficient of determination representing a correlation between the heat capacity per unit area and the gloss difference, $R^2$=0.9628 is obtained from the above described values of the heat capacity per unit area and the gloss difference. This indicates that the correlation between the heat capacity per unit area and the gloss difference is high.

Furthermore, when the values of the heat capacity per unit area and the heater-back temperature rising rate are plotted, the following linear function is obtained:

$$y=-110.44x+23.415$$

where x is the heat capacity per unit area, and y is the heater-back temperature rising rate. The linear function is indicated by line L2 in FIG. 14.

When $R^2$ is defined as a coefficient of determination representing a correlation between the heat capacity per unit area and the heater-back temperature rising rate, $R^2=0.9926$ is obtained from the above described values of the heat capacities per unit area and the heater-back temperature rising rate. This indicates that the correlation between the heat capacity per unit area and the heater-back temperature rising rate is high.

In order to make the gloss difference invisible, the gloss difference is preferably 5.0 or smaller. Further, in order to check whether the heater 46 is activated or not, the heater-back temperature rising rate is preferably 5.0 [° C./sec] or higher.

For this reason, in the embodiment, the heat capacity per unit area of the heat storage member 45 is 0.05 [J/k·cm$^2$] or more and 0.16 [J/k·cm$^2$] or less.

Next, the thermal diffusivity will be described.

First, a measurement method of the thermal diffusivity will be described.

FIG. 15 illustrates the heat storage member 45, a measurement device 71 for measuring the thermal diffusivity, and a temperature detector 73. As the measurement device 71, "Thermo Wave Analyzer TA35" manufactured by Bethel Co., Ltd., (Hudson Laboratory) was used. The thermal diffusivity of the heat storage member 45 in its thickness direction was measured by a distance variation method using the measurement device 71. As the temperature detector 73, an InSb (indium antimonide) detector was used. A surface of the heat storage member 45 facing the heater 46 (FIG. 1) in the fixing device 31 is defined as an irradiation surface Fa, while the other surface of the heat storage member 45 facing the thermistor Th is defined as a detection surface Fb.

The surface of the heat storage member 45 was applied with graphite spray, and was subjected to blackening. The measurement device 71 was placed to face the heat storage member 45 at a predetermined measurement position PO, and then the irradiation surface Fa of the heat storage member 45 was irradiated with heating light ε. A semiconductor laser beam having a wavelength of 808 [nm] was used as the heating light ε. The irradiation with the laser beam was conducted with a pulse width of 10 [μs] to 100 [μs] at a beam angle of 48 [degrees]. The temperature detector 73 was placed to face the detection surface Fb at the measurement position PO. By varying the frequency of the semiconductor laser beam in a range of 3.6 [Hz] to 14.0 [Hz], a phase difference for each frequency was calculated, and the thermal diffusivity of the heat storage member 45 was calculated based on the calculated phase difference.

Since the heat storage member 45 is formed by laminating and bonding polyimide films onto the heater 46, the thermal diffusivity of the heat storage member 45 is equal to the thermal diffusivity of polyimide which is the material of the film. Regardless of the number of polyimide films, the thermal diffusivity of the heat storage member 45 is $0.302\times10^{-6}$ [m$^2$/s].

In the embodiment, since the surface layer 39*c* of the fixing belt 39 (FIG. 8) is made of tetrafluoroethylene-perfluoroalkoxy ethylene copolymer, the thermal diffusivity of the fixing belt 39 is equal to the thermal diffusivity of tetrafluoroethylene-perfluoroalkoxy ethylene copolymer, i.e., $0.41\times10^{-6}$ [m$^2$/s].

Therefore, a difference between the thermal diffusivity of the fixing belt 39 and the thermal diffusivity of the heat storage member 45 is preferably $0.108\times10^{-6}$ [m$^2$/s] or more.

If a difference between the thermal diffusivity of the fixing belt 39 and the thermal diffusivity of the heat storage member 45 is less than $0.108\times10^{-6}$ [m$^2$/s], heat stored in the heat storage member 45 may be dissipated during the first turn of the fixing belt 39, and thus the amount of heat stored in the heat storage member 45 and transferred to the fixing belt 39 via the heater 46 may decrease in the second turn of the fixing belt 39, which may increase the gloss difference. Therefore, the difference between the thermal diffusivity of the fixing belt 39 and the thermal diffusivity of the heat storage member 45 is preferably $0.108\times10^{-6}$ [m$^2$/s] or more.

As the number of polyimide films increases, the heat capacity of the heat storage member 45 increases, thereby the heat storage member 45 is able to store much more heat transferred from the heater 46. Even if the heat of the fixing belt 39 is taken away by the sheet P during the first turn of the fixing belt 39 due to the passage of the sheet P, heat stored in the heat storage member 45 is transferred to the fixing belt 39 via the heater 46. Thus, the heat can be stably transferred to the sheet P even in the second turn of the fixing belt 39.

As described above, in the embodiment, the heat storage member 45 is disposed on the side of the heater 46 opposite to the fixing belt 39, and the thermal diffusivity of the heat storage member 45 is lower than that of the fixing belt 39. Thus, the heat storage member 45 is able to store sufficient heat, and a decrease in the temperature of the heat storage member 45 can be prevented.

Therefore, the heat can be sufficiently transferred to the fixing belt 39. The heat taken away from the fixing belt 39 at the fixing nip Np due to the passage of the sheet P can be replenished by the heat storage member 45 via the heater 46. Thus, the temperature of the fixing belt 39 can be made uniform.

That is, a change in the temperature of the fixing belt 39 between the first and second turns of the movement (rotation) of the fixing belt 39 can be made small. Thus, it is possible to suppress a gloss difference at the boundary between the image portions formed in the first turn and the second turn of the fixing belt 39.

As a result, the image quality can be improved. That is, a high quality image can be formed even when the printing is performed at high speed.

The heat capacity per unit area of the heat storage member 45 is 0.05 [J/K·cm$^2$] or more, and thus it is possible to reduce the gloss difference to 2.5 or smaller. Therefore, the image quality can be further improved.

Since the heat capacity per unit area of the heat storage member 45 is 0.16 [J/K·cm$^2$] or less, the heater-back temperature rising rate can be set to 5.0 [° C./sec] or higher. Therefore, whether the heater 46 is activated or not can be checked surely.

In the embodiment, the heat storage member 45 is made of polyimide film(s), but other material may be used. A material having a thermal diffusivity lower than that of the fixing belt 39 can be used for the heat storage member 45. In particular, a heat resistant resin having a thermal diffusivity lower than that of the fixing belt 39 is preferably used for the heat storage member 45. Examples of the heat resistant resin suitable for the heat storage member 45 include, for example, a polyamide-based resin such as polyamide 6 (PA6), as well as a polyimide resin. The thermal diffusivity of polyamide 6 is $0.183\times10^{-6}$ [m$^2$/s]. When polyamide 6 is used for the material of the heat storage member 45, the thickness of the polyamide 6 is preferably adjusted so that the heat capacity per unit area of the heat storage member 45 is 0.05 [J/K·cm$^2$] or more, and 0.16 [J/K·cm$^2$] or less.

Even when polyamide 6 is used for the material of the heat storage member 45, the heat stored in the heat storage member 45 may be dissipated to the outside during the first turn of the fixing belt 39, if a difference between the thermal diffusivity of the fixing belt 39 and the thermal diffusivity of the heat storage member 45 is less than $0.108\times10^{-6}$ [$m^2/s$]. In such a case, the amount of heat stored in the heat storage member 45 and transferred to the fixing belt 39 via the heater 46 may decrease in the second turn of the fixing belt 39, which may increase the gloss difference. For this reason, the difference between the thermal diffusivity of the fixing belt 39 and the thermal diffusivity of the heat storage member 45 is preferably $0.108\times10^{-6}$ [$m^2/s$] or more.

Therefore, in order to make the difference between the thermal diffusivities of the fixing belt 39 and the heat storage member 45 to $0.108\times10^{-6}$ [$m^2/s$] or more when the thermal diffusivity of the heat storage member 45 is in a range of $0.183\times10^{-6}$ [$m^2/s$] to $0.302\times10^{-6}$ [$m^2/s$], the thermal diffusivity of the fixing belt 39 is set to $0.291\times10^{-6}$ [$m^2/s$] or higher and $0.410\times10^{-6}$ [$m^2/s$] or lower by appropriately choosing the material of the fixing belt 39 (for example, resin of the base material layer 39*a*). In this regard, $0.291\times10^{-6}$ [$m^2/s$] is a sum of $0.183\times10^{-6}$ [$m^2/s$] and $0.108\times10^{-6}$ [$m^2/s$]. Further, $0.410\times10^{-6}$ [$m^2/s$] is a sum of $0.183\times10^{-6}$ [$m^2/s$] and $0.302\times10^{-6}$ [$m^2/s$].

Next, a state of disposing the thermistor Th will be described.

In the embodiment, the thermistor Th illustrated in FIG. 1 is disposed to face the entire surface of the heat storage member 45, but the state of disposing the thermistor Th can be modified.

Figure 16:
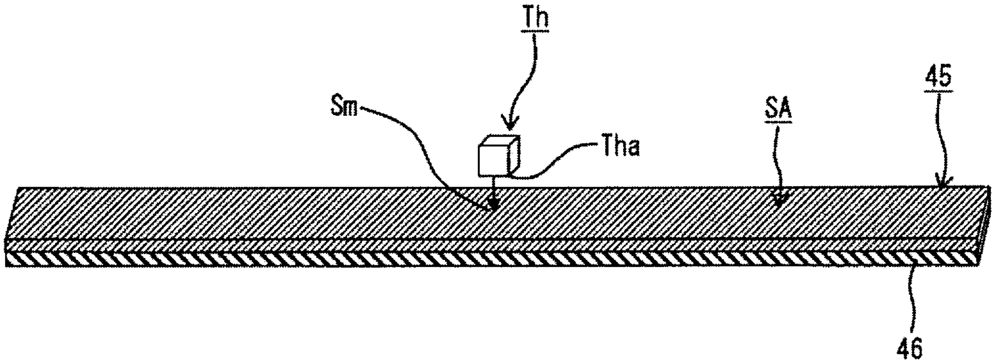
FIG. 16 is a diagram illustrating an example of a state of disposing a thermistor in the embodiment.
Figure 17:
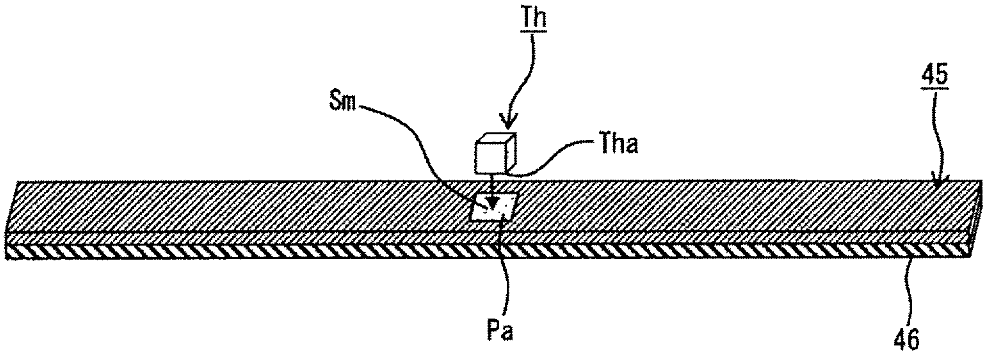
FIG. 17 is a plan view illustrating another example of the state of disposing the thermistor in the embodiment.
Figure 18:
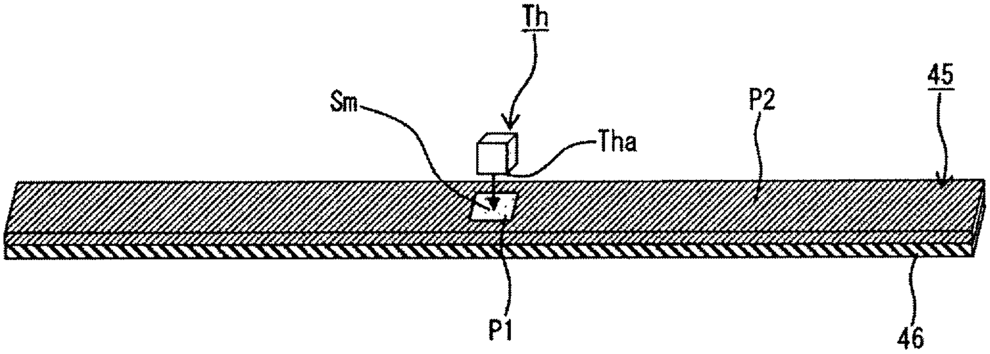
FIG. 18 is a diagram illustrating still another example of the state of disposing the thermistor in the embodiment.

FIG. 16 is a diagram illustrating an example of the state of disposing the thermistor Th in the embodiment. FIG. 17 is a diagram illustrating another example of the state of disposing the thermistor Th in the embodiment. FIG. 18 is a diagram illustrating still another example of the state of disposing the thermistor Th in the embodiment.

In FIGS. 16, 17 and 18, reference numeral 45 denotes the heat storage member, reference numeral SA denotes an entire surface of the heat storage member 45, reference numeral 46 denotes the heater, reference numeral Th denotes the thermistor, reference numeral Tha denotes a detection surface, and reference numeral Sm denotes a detection position on the heat storage member 45 for temperature detection.

In the embodiment, as illustrated in FIG. 16, the thermistor Th is disposed so that the detection surface Tha faces the entire surface SA (specifically, a portion of the entire surface SA corresponding to the detection position Sm) of the heat storage member 45, and the thermistor Th is configured to detect the temperature of the detection position Sm. As illustrated in FIG. 17, a member having a thermal diffusivity higher than that of the heat storage member 45 (i.e., polyimide film) is disposed at the detection position Sm of the heat storage member 45 to thereby form a high thermal diffusivity section Pa. The thermistor Th can be disposed so that the detection surface Tha faces the high thermal diffusivity section Pa. With this arrangement, the high thermal diffusivity section Pa easily diffuses heat from the heater 46, and therefore the temperature of the heater 46 can be easily detected by the thermistor Th. Thus, the temperature of the heater 46 can be controlled with high accuracy.

Furthermore, as illustrated in FIG. 18, first and second portions P1 and P2 are formed on the entire surface SA of the heat storage member 45. The thermal diffusivity of the first portion P1 is higher than that of the second portion P2. Further, the thermal diffusivities of both of the first and second portions P1 and P2 are desirably higher than the thermal diffusivity of the heat storage member 45 (i.e., polyimide film). The first portion P1 is provided at the detection position Sm. The thermistor Th can be disposed so that the detection surface Tha faces the first portion P1.

With this arrangement, it is possible to prevent occurrence of a portion where the thermal diffusivity largely changes on the entire surface SA of the heat storage member 45. Thus, occurrence of the gloss difference in the image can be prevented.

In the embodiment, the heater 46 and the heat diffusion member 47 are disposed between the heat storage member 45 and the fixing belt 39, but it is also possible to dispose only the heater 46 as a heating member between the heat storage member 45 and the fixing belt 39.

In the embodiment, the laminated polyimide films are bonded to the heater 46, but a heat storage material whose thermal diffusivity is lower than that of the fixing belt 39 may be applied to the surface of the heater 46, or the surface of the heater 46 may be coated with such a heat storage material.

In the embodiment, the term "heat resistant resin" refers to a resin having a glass transition temperature higher than a temperature of the heater 46 generating heat. Because the temperature of the heater 46 can be increased up to 200 [° C.], a resin having the glass transition temperature of 200 [° C.] or higher is referred to as the "heat resistant resin".

The printer 10 has been described in the above-described embodiment, but the present disclosure is also applicable to image forming apparatuses such as copiers, facsimile machines, and multifunction peripherals.

The present disclosure is not limited to the above-described embodiment, and various modifications and changes can be made to the embodiment without departing from the spirit and scope of the present disclosure as described in the following claims.

DESCRIPTION OF REFERENCE CHARACTERS

31 fixing device; 39 fixing belt; 45 heat storage member; heater; Si inner circumferential surface.

What is claimed is:

1. A fixing device, comprising:
an annular belt having an outer circumferential surface and an inner circumferential surface;
a facing member forming a fixing nip with the outer circumferential surface of the annular belt at a nip area;
a heating member facing the inner circumferential surface of the annular belt at the nip area;
a holder member disposed at an inner side of the annular belt and holding the heating member; and
a heat storage member disposed between the heating member and the holder member so as to face a surface of the heating member at a side opposite to a side at which the annular belt is disposed, wherein
the heat storage member has a thermal diffusivity lower than a thermal diffusivity of the annular belt, and
the heating member includes:
a heater disposed to face the heat storage member, and having a first surface and a second surface that are opposite to each other, the second surface facing the annular belt, and
a heat diffusion member made of a metal, and having a first side and a second side that are opposite to each other and respectively face the first surface of the heater and the annular belt at the nip area, and
at the nip area, the heater contacts the first side of the heat diffusion member and the second side of the heat diffusion member contacts the annular belt in such a way that heat from the heater is transferred to the outer circumferential surface of the annular belt through the heat diffusion member.

2. The fixing device according to claim 1, wherein a heat capacity per unit area of the heat storage member is 0.05 [J/K·cm$^2$] or more.

3. The fixing device according to claim 1, wherein a heat capacity per unit area of the heat storage member is 0.16 [J/K·cm$^2$] or less.

4. The fixing device according to claim 1, wherein a thermal diffusivity of the heat storage member is $0.183\times10^{-6}$ [m$^2$/s] or higher and $0.302\times10^{-6}$ [m$^2$/s] or lower.

5. The fixing device according to claim 4, wherein a difference between the thermal diffusivity of the annular belt and the thermal diffusivity of the heat storage member is $0.108\times10^{-6}$ [m$^2$/s] or more.

6. The fixing device according to claim 5, wherein the thermal diffusivity of the annular belt is $0.291\times10^{-6}$ [m$^2$/s] or higher and $0.410\times10^{-6}$ [m$^2$/s] or lower.

7. The fixing device according to claim 1, wherein the thermal diffusivity of the heat storage member is lower than a thermal diffusivity of the heat diffusion member.

8. The fixing device according to claim 1, wherein the heat storage member is comprised of at least one heat resistant resin film, each of which is laminated on the heater.

9. The fixing device according to claim 1, wherein the heat diffusion member is sandwiched from a thickness direction thereof between the heater and the inner circumferential surface of the annular belt at the nip area, and a size, from a view from the thickness direction, of each of the heater, the heat diffusion member and the fixing nip is the same.

10. An image forming apparatus comprising the fixing device according to claim 1.

11. The fixing device according to claim 1, wherein the heat storage member is a film.

12. The fixing device according to claim 1, wherein the heater includes a substrate and a heating section provided on the substrate.

13. The fixing device according to claim 1, wherein the heat storage member is a film, a surface of which is entirely in direct contact with the heating member.

14. The fixing device according to claim 1, wherein the heater includes a substrate and a heating section provided on the substrate, the heating section being in direct contact with the heat storage member.

15. The fixing device according to claim 1, wherein the heat diffusion member has a contact portion contacting the inner circumferential surface of the annular belt, and two opposite engaging portions that respectively protrude in a direction orthogonal to a surface of the contact portion toward the holder member, at two opposite edges of the contact portion in a circumferential direction of the annular belt, the heat diffusion member holding the heater and the heat storage member on the contact portion between the two opposite engaging portions.

16. The fixing device according to claim 1, further comprising a coating layer provided on the second side of the heat diffusion member, the second side of the heat diffusion member contacting the annular belt through the coating layer.

17. The fixing device according to claim 16, wherein grease is provided between the coating layer and the annular belt so that the coating layer contacts the annular belt through the grease.

18. The fixing device according to claim 1, wherein grease is provided between the heater and the first side of the heat diffusion member so that the heater contacts the first side of the heat diffusion member through the grease.

19. A fixing device, comprising:

an annular belt;

a heating member facing an inner circumferential surface of the annular belt;

a holder member disposed at an inner side of the annular belt and holding the heating member;

a heat storage member disposed between the heating member and the holder member so as to face a surface of the heating member at a side opposite to a side at which the annular belt is disposed; and a thermistor having a detection surface for detecting a temperature of the heat storage member, wherein the heat storage member has a thermal diffusivity lower than a thermal diffusivity of the annular belt, wherein the heat storage member has a first portion that faces the detection surface and a second portion that does not face the detection surface, and wherein a thermal diffusivity of the first portion is higher than a thermal diffusivity of the second portion.

20. A fixing device comprising:

an annular belt;

a heating member facing an inner circumferential surface of the annular belt;

a holder member disposed at an inner side of the annular belt and holding the heating member; and a film disposed between the heating member and the holder member so as to face a surface of the heating member at a side opposite to a side at which the annular belt is disposed, wherein the film has a thermal diffusivity lower than a thermal diffusivity of the annular belt, and the heating member includes a heater disposed to face the film, and a heat diffusion member made of a metal, disposed between the annular belt and the heater, and contacting the annular belt, and a surface area of which is smaller than a surface area of the heating member.

* * * * *